US012001702B2

United States Patent
Matsuda et al.

(10) Patent No.: US 12,001,702 B2
(45) Date of Patent: Jun. 4, 2024

(54) MEMORY SYSTEM AND METHOD TO CONFIGURE LOGICAL BLOCKS

(71) Applicant: Kioxia Corporation, Tokyo (JP)

(72) Inventors: Toshiya Matsuda, Yokohama Kanagawa (JP); Hiroki Yoshimoto, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 44 days.

(21) Appl. No.: 17/879,880

(22) Filed: Aug. 3, 2022

(65) Prior Publication Data

US 2023/0289080 A1    Sep. 14, 2023

(30) Foreign Application Priority Data

Mar. 8, 2022    (JP) ................. 2022-035432

(51) Int. Cl.
*G06F 3/06* (2006.01)
(52) U.S. Cl.
CPC ............ *G06F 3/064* (2013.01); *G06F 3/0616* (2013.01); *G06F 3/0659* (2013.01); *G06F 3/0679* (2013.01)
(58) Field of Classification Search
CPC ...... G06F 3/064; G06F 3/0616; G06F 3/0659; G06F 3/0679
See application file for complete search history.

(56) References Cited

U.S. PATENT DOCUMENTS

| | | | |
|---|---|---|---|
| 9,405,621 B2 | 8/2016 | Yu et al. | |
| 11,150,829 B2 | 10/2021 | Yamamoto et al. | |
| 2010/0082917 A1* | 4/2010 | Yang | G06F 12/0607 |
| | | | 711/E12.007 |
| 2014/0310574 A1 | 10/2014 | Yu et al. | |
| 2017/0162235 A1* | 6/2017 | De | G06F 12/0607 |
| 2018/0018111 A1* | 1/2018 | Byun | G06F 3/0632 |
| 2019/0179698 A1* | 6/2019 | Liu | G06F 3/0679 |
| 2019/0196959 A1* | 6/2019 | Ji | G06F 12/0802 |
| 2019/0286338 A1* | 9/2019 | Noda | G06F 3/0659 |
| 2019/0310936 A1* | 10/2019 | Novogran | G06F 12/0868 |
| 2020/0034067 A1 | 1/2020 | Yamamoto et al. | |
| 2020/0371715 A1* | 11/2020 | Lee | G06F 3/0673 |
| 2022/0147247 A1* | 5/2022 | Ammari | G06F 3/0679 |
| 2022/0147392 A1* | 5/2022 | Choi | G06F 13/102 |
| 2022/0300156 A1* | 9/2022 | Park | G06F 3/0659 |
| 2022/0413699 A1* | 12/2022 | Luo | G06F 11/07 |

FOREIGN PATENT DOCUMENTS

JP    2017-146722 A    8/2017

* cited by examiner

*Primary Examiner* — Ryan Bertram
(74) *Attorney, Agent, or Firm* — Foley & Lardner LLP (57) ABSTRACT

A memory system includes a non-volatile memory and a controller. The non-volatile memory includes a plurality of memory chips including one or more first memory chips, each first memory chip including a plurality of physical blocks and one or more second memory chips, each second memory chip including a plurality of physical blocks, each memory chip configured to operate independently. The controller can communicate with a host and controls the non-volatile memory. The controller configures a first logical block by parallelizing physical blocks of each of one or more first memory chips and physical blocks of each of one or more second memory chips in an interleaved configuration so that the physical blocks of each of one or more first memory chips and the physical blocks of each of one or more second memory chips can be used simultaneously.

16 Claims, 10 Drawing Sheets

MEMORY SYSTEM AND METHOD TO CONFIGURE LOGICAL BLOCKS

CROSS-REFERENCE TO RELATED APPLICATION(S)

This application is based upon and claims the benefit of priority from Japanese Patent Application No. 2022-035432, filed Mar. 8, 2022, the entire contents of which are incorporated herein by reference.

FIELD

Embodiments described herein relate generally to memory systems and methods.

BACKGROUND

Memory systems such as a solid state drive (SSD) and a universal flash storage (UFS) provided with a NAND flash memory are known.

For the memory systems, cost reduction is required, and performance and reliability are required to be maintained at the current level. In other words, it is necessary to develop products satisfying cost, performance, and reliability.

DETAILED DESCRIPTION

At least one embodiment provides a memory system and a method capable of satisfying cost, performance, and reliability.

In general, according to at least one embodiment, a memory system includes a non-volatile memory and a controller. The non-volatile memory includes a plurality of memory chips including one or more first memory chips, each first memory chip including a plurality of physical blocks and one or more second memory chips, each second memory chip including a plurality of physical blocks, each memory chip configured to operate independently. The controller is configured to communicate with a host and control the non-volatile memory. The controller is configured to configure a first logical block by parallelizing physical blocks of each of one or more first memory chips and physical blocks of each of one or more second memory chips in an interleaved configuration so that the physical blocks of each of one or more first memory chips and the physical blocks of each of one or more second memory chips can be used simultaneously.

Hereinafter, embodiments will be described with reference to the drawings.

Figure 1:
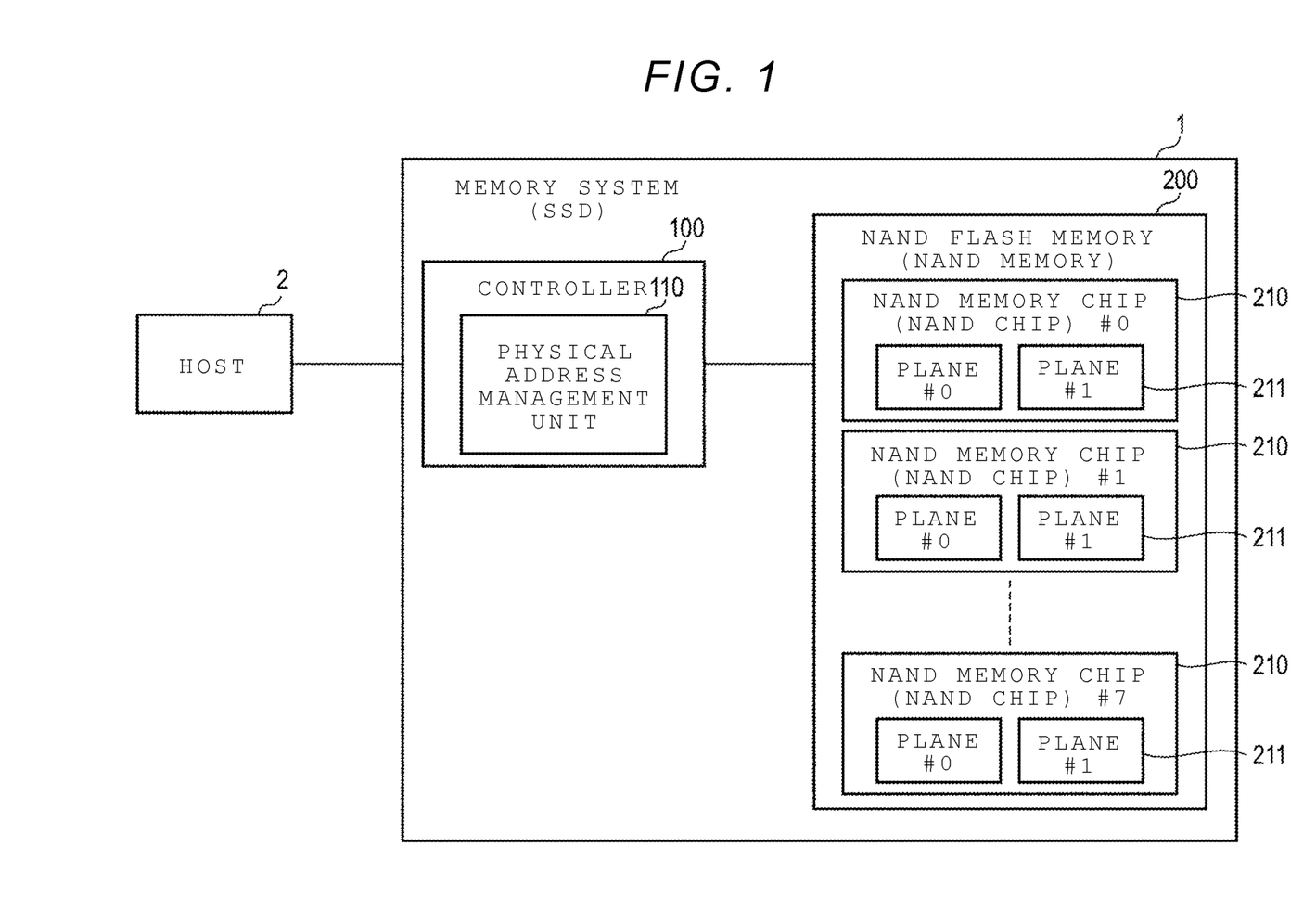
FIG. 1 is a diagram illustrating one configuration example of a memory system according to at least one embodiment.

FIG. 1 is a diagram illustrating one configuration example of a memory system 1 of at least one embodiment. FIG. 1 also illustrates one configuration example of an information processing system including the memory system 1 and a host 2 that stores and uses the memory system 1. The host 2 is also referred to as an information processing device, and is, for example, a personal computer or a server. The information processing system may be configured by incorporating the memory system 1 in the host 2, the information processing system may be configured by inserting the memory system 1 into a card slot of the host 2, or the information processing system may be configured by connecting the memory system 1 to the host 2 via a cable or a network. The information processing system may be, for example, an imaging device such as a camera, a mobile terminal such as a tablet computer or a smartphone, a game device, or an in-vehicle terminal such as a car navigation system.

The memory system 1 includes a NAND flash memory (NAND memory) 200 and a controller 100 that controls the NAND memory 200. Examples of the memory system 1 include a memory card, a solid state drive (SSD), an embedded multimedia card (eMMC), a universal flash storage (UFS), and the like. The controller 100 can communicate with the host 2 by using a protocol conforming to, for example, the NVM Express™ (NVMe™) specification.

The NAND memory 200 includes a plurality of NAND memory chips (NAND chips) 210. Herein, exemplified is a case where eight NAND chips (#0 to #7) 210 are provided in the NAND memory 200. Each of the NAND chips 210 includes a plurality of planes 211. Herein, exemplified is a case where two planes (#0, #1) 211 are provided in each of the plurality of NAND chips 210.

A plurality of channels including a communication line (memory bus) for the controller 100 to communicate with each NAND chips 210 are provided between the controller 100 and the NAND memory 200. The plurality of NAND chips 210 are connected to each of the plurality of channels. Herein, it is assumed that eight channels are provided and the NAND chips 210 one by one are connected to each channel. In the NAND memory 200, the eight NAND chips 210 (#0 to #7) can operate in a parallel fashion. Further, in each of NAND chips 210, the two planes (#0, #1) 211 can operate in parallel. The controller 100 can simultaneously (in parallel) communicate with the two planes in the same NAND chips 210 on each channel, for example, by time division communication. That is, the controller 100 can perform data writing to the NAND memory 200 and data reading from the NAND memory 200 for the 16 (eight NAND chips 210×two planes 211) units of a process simultaneously (in parallel).

Figure 2:
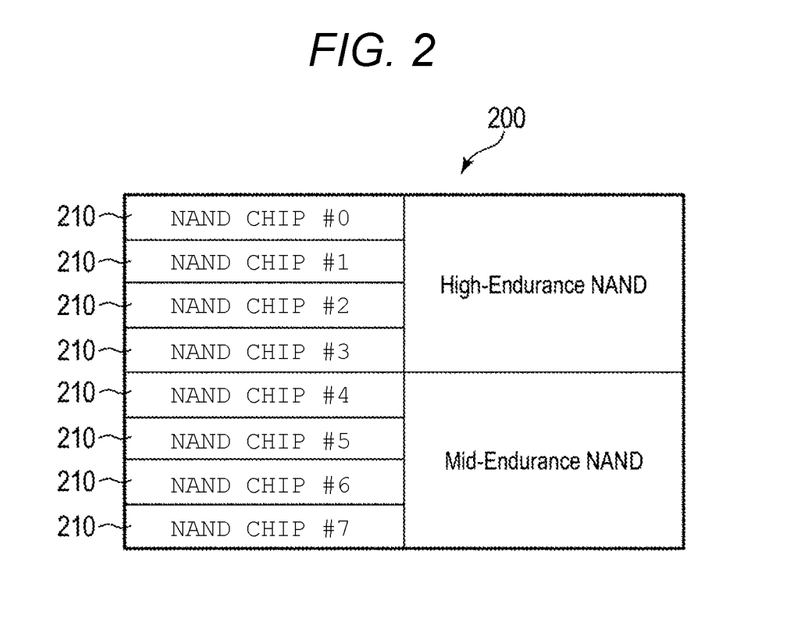
FIG. 2 is a diagram illustrating an example of details of a plurality of types of NAND chips mixed in a NAND memory in the memory system of at least one embodiment.

In the memory system 1 of the embodiment, the NAND memory 200 is configured by mixing a plurality of types of the NAND chips 210 having different reliability, lifetime, performance, and the like. The reliability, lifetime, performance, and the like of the NAND chips 210 are also referred to as endurance. The reliability represents general characteristics as a NAND chips 210, such as, for example, an error bit rate of the data read from the NAND chips 210, rewriting resistance such as the number of times of writing/erasing to the NAND chips 210, a data retention property referred to as data retention, and a phenomenon in which charges fluctuate when data are consecutively read out without being rewritten referred to as read disturb and the like. The performance is, for example, an index indicating a time required for data transfer between the controller 100 and the NAND chips 210. In this case, a deterioration in performance means that the time required for data transfer between the controller 100 and the NAND chips 210 becomes long. Further, the performance may be an index, for example, including the time required for data transfer and indicating the latency from the time when the memory system 1 receives a command from the host 2 to the time when the memory system 1 notifies the host 2 that a command process is completed. In this case, the deterioration in performance means that the latency from the time when the memory system 1 receives the command from the host 2 to the time when the memory system 1 notifies the host 2 that the command process is completed becomes long. Herein, as illustrated in FIG. 2, exemplified is a case where, among the eight NAND chips 210 (#0 to #7) 210, the four NAND chips (#0 to #3) 210 are high-level endurance NAND chips (High-Endurance NAND) and the remaining four NAND chips (#4 to #7) 210 are medium-level endurance NAND chips (Mid-Endurance NAND). That is, the NAND memory 200 is configured with two types of the NAND chips 210, that is, the NAND chips 210 of High-Endurance and the NAND chips 210 of Mid-Endurance.

The controller 100 includes a physical address management unit 110. The physical address management unit 110 manages a physical address indicating a physical position on the NAND memory 200. As described above, the memory system 1 includes the NAND memory 200 by mixing two types of the NAND chips 210. Further, in the memory system 1, the physical address management unit 110 sets and manages three types of logical areas described later with respect to the NAND memory 200 in which two types of the NAND chips 210 are mixed. In other words, the physical address management unit 110 manages the physical address for properly using the three types of logical areas in the NAND memory 200 in which the two types of the NAND chips 210 are mixed. (1) The NAND memory 200 is configured by mixing two types of the NAND chips 210, and (2) three types of logical areas are used properly in the NAND memory 200 in which two types of the NAND chips 210 are mixed, so that the cost of the memory system 1 can be reduced and the performance and the reliability of the memory system 1 can be maintained at the current level. That is, the memory system 1 makes it possible that the cost, the performance, and the reliability are satisfied. Hereinafter, this point will be described in detail below.

Figure 3:
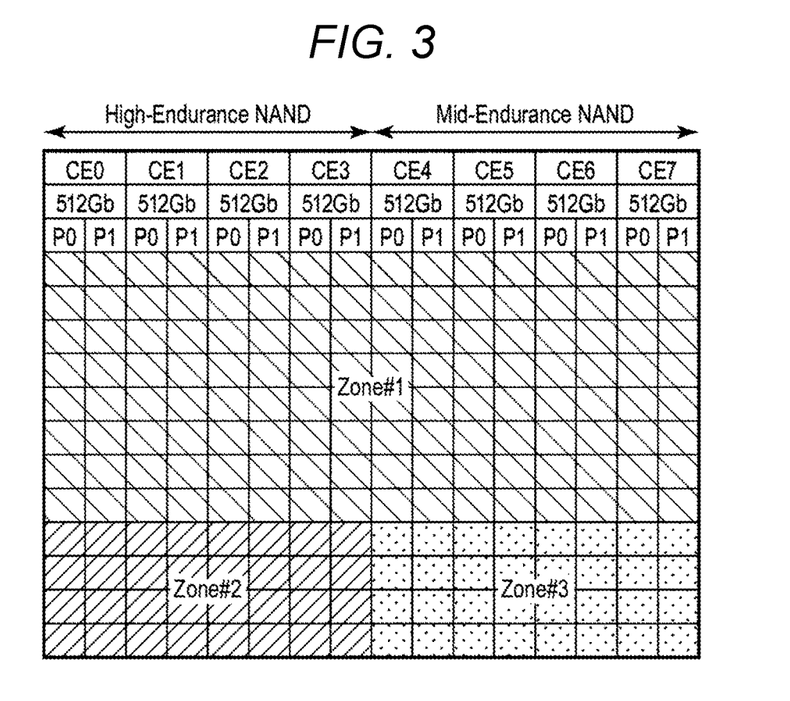
FIG. 3 is a diagram illustrating one configuration example of a NAND memory using two types of the NAND chips in the memory system of the embodiment and one arrangement example of three types of logical areas on the NAND memory.

FIG. 3 is a diagram illustrating one configuration example of the NAND memory 200 in which two types of the NAND chips (High-Endurance NAND and Mid-Endurance NAND) 210 are mixed and one arrangement example of three types of logical areas (Zone #1 to Zone #3) on the NAND memory 200 in which two types of the NAND chips 210 are mixed, of the memory system 1 of the embodiment.

In FIG. 3, each of "CEx (x: 0 to 7)" represents one NAND chip 210. FIG. 3 illustrates an example in which the NAND memory 200 is configured with the eight NAND chips 210, each of which has a storage capacity of 512 Gbit. Each "Pn (n: 0, 1)" represents one plane. Each of squares arranged in a matrix configuration below "P0"/"P1" represents one physical block. For example, each square in the "P0" column in the "CE0" column represents one physical block of the plane (#0) 211 of the NAND chip (#0) 210. The physical address management unit 110 manages the physical addresses indicating the physical positions on the NAND memory 200 so as to be consecutive with, for example, the physical blocks for one row of the squares arranged in the row direction. More specifically, the physical address management unit 110 manages the physical addresses of the NAND memory 200 so that the physical addresses in the logical blocks described later become consecutive.

The physical address management unit 110 divides the physical blocks in the NAND memory 200 into, for example, three groups. For example, the physical address management unit 110 divides the physical blocks of each plane (#0, #1) of the NAND chips (#0 to #3) 210 of High-Endurance into two and also divides the physical blocks of each plane (#0, #1) of the NAND chips (#4 to #7) 210 of Mid-Endurance into two. The physical address management unit 110 assigns one of the divided physical blocks of each plane (#0, #1) of the NAND chips (#0 to #3) 210 of High-Endurance to a first group and assigns the other of the divided physical blocks to a second group. Further, the physical address management unit 110 assigns one of the divided physical blocks of each plane (#0, #1) of the NAND chips (#4 to #7) 210 of Mid-Endurance to the first group and assigns the other of the divided physical blocks to a third group. An aggregate of the physical blocks belonging to the first group includes one logical area (Zone #1) on the NAND memory 200. An aggregate of the physical blocks belonging to the second group includes one logical area (Zone #2) on the NAND memory 200. An aggregate of physical blocks belonging to the third group includes one logical area (Zone #3) on the NAND memory 200.

The physical address management unit 110 generates the logical block described later in Zone #1 by using the physical blocks belonging to the first group. More specifically, the physical address management unit 110 generates the logical block of Zone #1 by using the physical blocks belonging to the first group of each plane (#0, #1) of the NAND chips (#0 to #3) 210 of High-Endurance and the physical blocks belonging to the first group of each plane (#0, #1) of the NAND chips (#4 to #7) 210 of Mid-Endurance, which are represented by the squares arranged in the row direction in FIG. 3. The logical block of Zone #1 is a block having an interleaved configuration in which, for example, the 16 physical blocks are parallelized so that data writing and data reading can be performed simultaneously (in parallel). Due to the management of the physical address management unit 110, the physical addresses in the logical block of Zone #1 become consecutive.

Further, the physical address management unit 110 generates the logical block of Zone #2 by using the physical blocks belonging to the second group of each plane (#0, #1) of the NAND chips (#0 to #3) 210 of High-Endurance, which are represented by squares arranged in the row direction in FIG. 3. The logical block of Zone #2 is a block having an interleaved configuration in which, for example, the eight physical blocks are parallelized so that data writing and data reading can be performed simultaneously (in parallel). Due to the management of the physical address management unit 110, the physical addresses in the logical block of Zone #2 also become consecutive.

Furthermore, the physical address management unit 110 generates the logical block of Zone #3 by using the physical blocks belonging to the third group of each plane (#0, #1) of the NAND chips (#4 to #7) 210 of Mid-Endurance, which are represented by the squares arranged in the row direction in FIG. 3. The logical block of Zone #3 is also a block having an interleaved configuration in which, for example, the eight physical blocks are parallelized so that data writing and data reading can be performed simultaneously (in parallel). Due to the management of the physical address management unit 110, the physical addresses in the logical block of Zone #3 also become consecutive.

For example, when the NAND memory 200 is configured with all the NAND chips 210 of High-Endurance, the cost will increase. On the other hand, when the NAND memory 200 is configured with all the NAND chips 210 of Mid-Endurance, the performance is deteriorated. That is, in any cases, the cost and performance cannot be satisfied.

Further, for example, when the NAND chips 210 of High-Endurance and the NAND chips 210 of Mid-Endurance are mixed in one NAND memory 200 and the NAND chips 210 of High-Endurance and the NAND chips 210 of Mid-Endurance are used completely separately, the number of units of a process in which data writing and data reading can be performed simultaneously (in parallel) is halved, and thus, the case where the performance required for an information processing system is not satisfied may also occur.

On the other hand, in the memory system 1 of at least one embodiment, the logical block is generated by using the physical blocks of the NAND chips 210 of High-Endurance and the physical blocks of the NAND chips 210 of Mid-Endurance, and the maximum number of units of a process in which data writing and data reading can be performed simultaneously (in parallel) is ensured, so that it is possible to maintain the performance while reducing the cost by applying the NAND chips 210 of Mid-Endurance.

Further, in the memory system 1 of at least one embodiment, the generation of the logical block by using only the physical blocks of the NAND chips 210 of High-Endurance and the generation of the logical block by using only the physical blocks of the NAND chips 210 of Mid-Endurance are performed at the same time. When writing data to the NAND memory 200, the memory system 1 select a data writing destination among three types of logical blocks on the basis of an instruction from the host 2, a data transfer rate applied in an interface with the host 2, a size of the data transmitted from the host, and the like.

The host 2 designates the logical areas (Zone #1 to Zone #3), for example, by adding a parameter to the write command. The host 2 designates Zone #1 in the case of data that requires, for example, writing or reading at a high rate (short-time). On the other hand, in the case of data that does not require writing or reading at a high rate (short time), the host 2 designates Zone #2 or Zone #3. For the proper use of Zone #2 and Zone #3, for example, in the case of data that allows writing and reading at a slower rate, various methods such as selecting Zone #3 can be applied.

In the case of selecting the logical areas (Zone #1 to Zone #3) in the memory system 1 on the basis of the data transfer rate applied in the interface with the host 2, for example, when the data transfer rate is the highest rate, Zone #1 is selected as a writing destination of the data transmitted from the host 2. The case where the data transfer rate is the highest rate is usually a case where there are many times of accessing from the host 2. For the selection of Zone #2 or Zone #3 when the data transfer rate is not the highest rate, various methods such as selecting Zone #3 when the data transfer rate is less than a threshold value can be applied.

In the case of selecting the logical areas (Zone #1 to Zone #3) in the memory system 1 on the basis of the size of the data transmitted from the host, for example, when the size is large, such as a moving image, Zone #1 is selected as a writing destination of the data transmitted from the host 2. For the selection of Zone #2 or Zone #3, various methods in which, for example, a threshold value having a smaller value is used and Zone #3 is selected when the size of the data is less than the threshold value can be applied.

In some cases, a bias in a data writing frequency to the three types of logical areas (Zone #1 to Zone #3) may occur according to the use of the host 2. Therefore, the memory system 1 (physical address management unit 110) counts the number of times of data writing for each of the three types of logical areas (Zone #1 to Zone #3). The memory system 1 updates the grouping of physical blocks in the NAND memory 200 on the basis of the counted number of times of data writing. In other words, the correspondence between the logical areas and the physical blocks is updated. Accordingly, the memory system 1 can average the number of times of data writing to the physical blocks in the NAND memory 200. That is, the memory system 1 can prevent wear of the specific physical block in the NAND memory 200 and extend the lifetime of the NAND memory 200. By using this, the memory system 1 can maintain the reliability of the NAND memory 200.

Herein, the logical block generated by the physical address management unit 110 will be described with reference to FIGS. 4 to 7.

Figure 4:
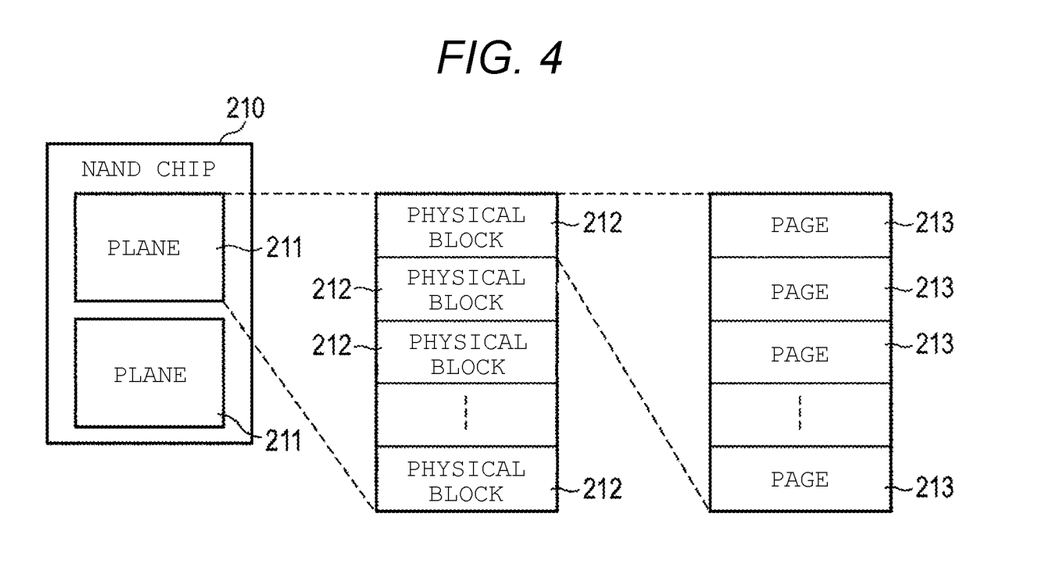
FIG. 4 is a diagram illustrating one configuration example of NAND chips provided in the NAND memory of the memory system of at least one embodiment.

FIG. 4 is a diagram illustrating one configuration example of the NAND chips 210.

As illustrated in FIG. 4, the NAND chip 210 includes a plurality of (herein, two) planes 211. Each of the plurality of planes 211 includes a plurality of physical blocks 212, each containing a plurality of pages 213. The data writing and the data reading are performed in units of a page 213. The data overwriting cannot be performed on the page 213 in which the data writing has been completed, and thus, data updating is performed by invalidating the original data on a certain page 213 and writing new data to the other page 213.

Figure 5:
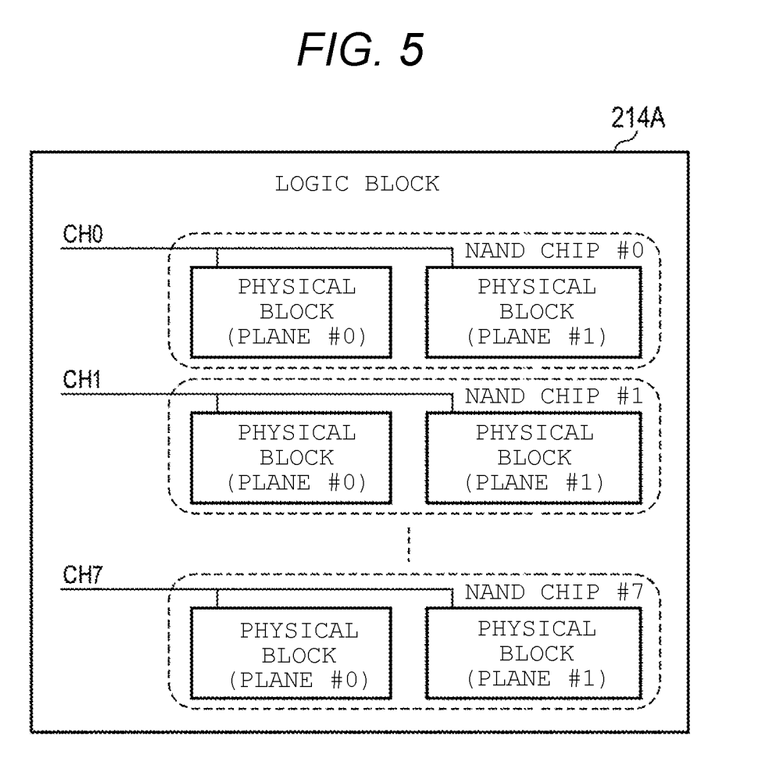
FIG. 5 is a diagram illustrating one configuration example of a logical block of Zone #1 in the memory system of at least one embodiment.

FIG. 5 is a diagram illustrating one configuration example of a logical block 214A of Zone #1.

The physical address management unit 110 selects the physical blocks 212 one by one from the physical blocks 212 belonging to the first group of each plane (#0, #1) of the NAND chips (#0 to #3) 210 of High-Endurance and the physical blocks 212 belonging to the first group of each plane (#0, #1) of the NAND chips (#4 to #7) 210 of Mid-Endurance to generate the logical block 214A of Zone #1 including a total of the 16 physical blocks 212. The 16 physical blocks 212 can be operated in parallel, and data writing, for example, to the logical block 214A of Zone #1 can be performed 16 pages by 16 pages.

That is, the memory system 1 of at least one embodiment realizes maintaining the performance while reducing the cost by generating the logical block 214A in which the physical blocks 212 of the NAND chips 210 of High-Endurance and the physical blocks 212 of the NAND chips 210 of Mid-Endurance are parallelized in an interleaved configuration and by adopting the NAND chips 210 of Mid-Endurance.

Figure 6:
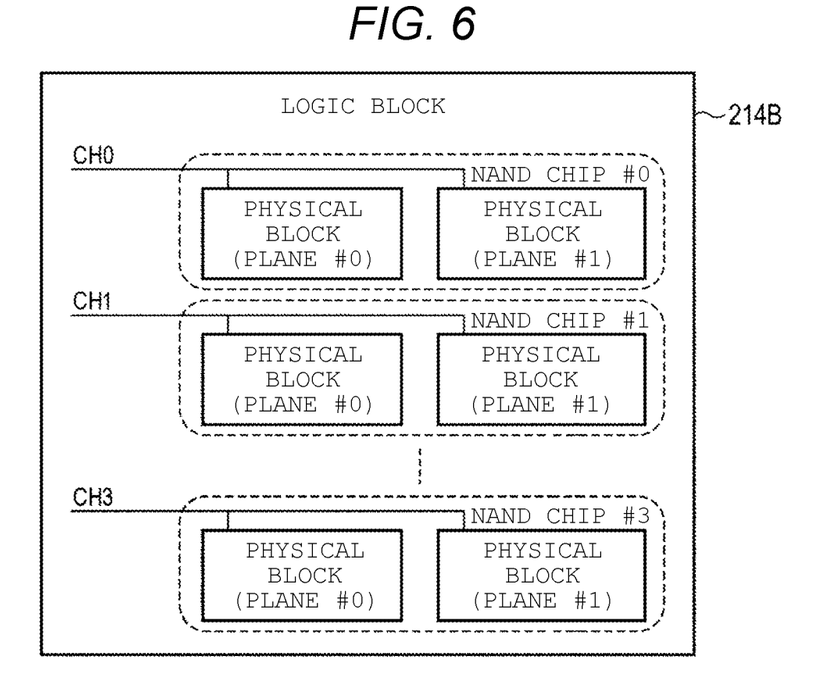
FIG. 6 is a diagram illustrating one configuration example of a logical block of Zone #2 in the memory system of at least one embodiment.

FIG. 6 is a diagram illustrating one configuration example of a logical block 214B of Zone #2.

The physical address management unit 110 selects the physical blocks 212 two by two from the physical blocks 212 belonging to the second group of each plane (#0, #1) of the NAND chips (#0 to #3) 210 of High-Endurance to generate the logical block 214B of Zone #2 including a total of the 16 physical blocks 212. The eight physical blocks 212 among the 16 physical blocks 212 can be operated in parallel, and data writing, for example, to the logical block 214B of Zone #2 can be performed by eight pages each.

It is noted that, when the physical address management unit 110 manages the size of the logical blocks (the number of physical blocks per logical block) for each of the logical areas (Zone #1 to Zone #3), the physical address management unit 110 may select the physical blocks 212 one by one from the physical blocks 212 belonging to the second group of each plane (#0, #1) of the NAND chips (#0 to #3) 210 of High-Endurance to generate the logical block 214B of Zone #2 including a total of the eight physical blocks 212.

Figure 7:
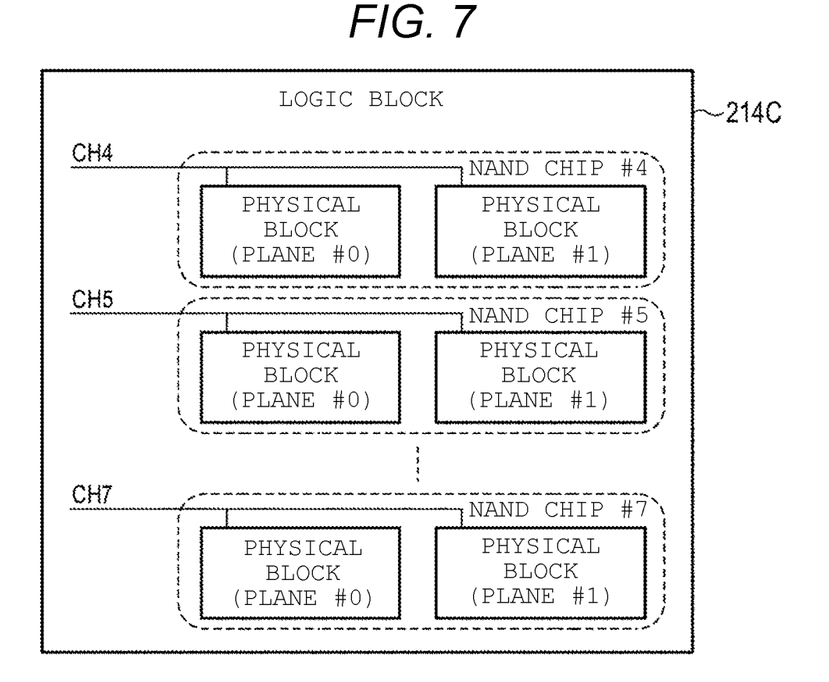
FIG. 7 is a diagram illustrating one configuration example of a logical block of Zone #3 in the memory system of at least one embodiment.

FIG. 7 is a diagram illustrating an example of a logical block 214C of Zone #3.

The physical address management unit 110 selects the physical blocks 212 two by two from the physical blocks 212 belonging to the third group of each plane (#0, #1) of the NAND chips (#4 to #7) 210 of Mid-Endurance to generate the logical block 214C of Zone #3 including a total of the 16 physical blocks 212. The eight physical blocks 212 among the 16 physical blocks 212 can be operated in parallel, and data writing, for example, to the logical block 214C of Zone #3 can be performed by eight pages each.

Similarly to the logical block 214B of Zone #2, when the physical address management unit 110 manages the size of the logical block for each logical area, the physical address management unit 110 may select the physical blocks 212 one by one from the physical blocks 212 belonging to the third group of each plane (#0, #1) of the NAND chips (#4 to #7) 210 of Mid-Endurance to generate the logical block 214C of Zone #3 including a total of the eight physical blocks 212.

As described above, data writing and data reading are performed in units of a page 213. On the other hand, data erasing is performed in units of a logical block 214A, 214B, or 214C, each of which includes a plurality of (herein, 16) the physical blocks 212. Further, as described above, the data updating is performed by invalidating original data on one page 213, and writing new data to another page 213. Therefore, in some cases, a state in which a certain logical block is mostly occupied by unnecessary data (invalid data) may occur. The occupancy ratio of valid data in a logical block is called a valid cluster rate or the like. As a process for reusing an area where invalid data remains, which is executed for a logical block with a small valid cluster rate, there is a process called garbage collection (also referred to as "compaction").

The garbage collection is a process for generating N-M free blocks by moving valid data in N (N is a natural number of 2 or more) logical blocks into M (M<N and M is a natural number of 1 or more) logical blocks. A free block is a logical block in an unused state. It is noted that the logical block in an unused state is not intended to be a logical block that has not been used but is intended to be a logical block in which data are erased and can be reused. Of course, a logical block that has not been used is also provided in the logical block in an unused state. That is, the memory system 1 has a function of moving valid data in the NAND memory 200.

Figure 8A:
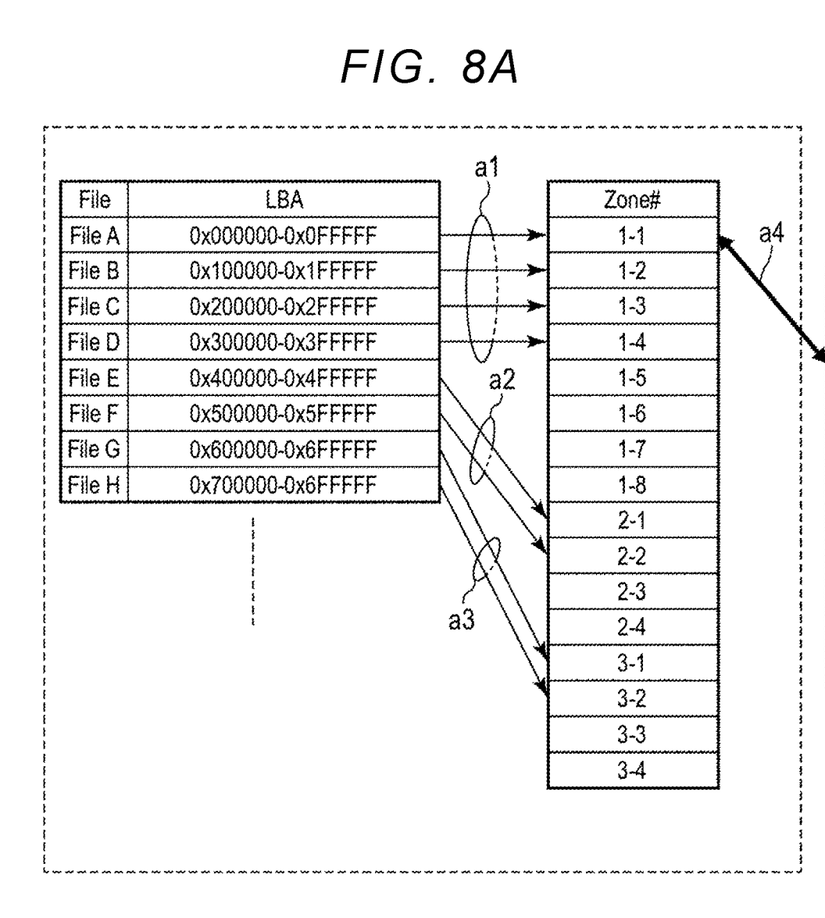
FIG. 8A and FIG. 8B are a diagram illustrating address management for the NAND memory in the memory system of at least one embodiment.
Figure 8B:
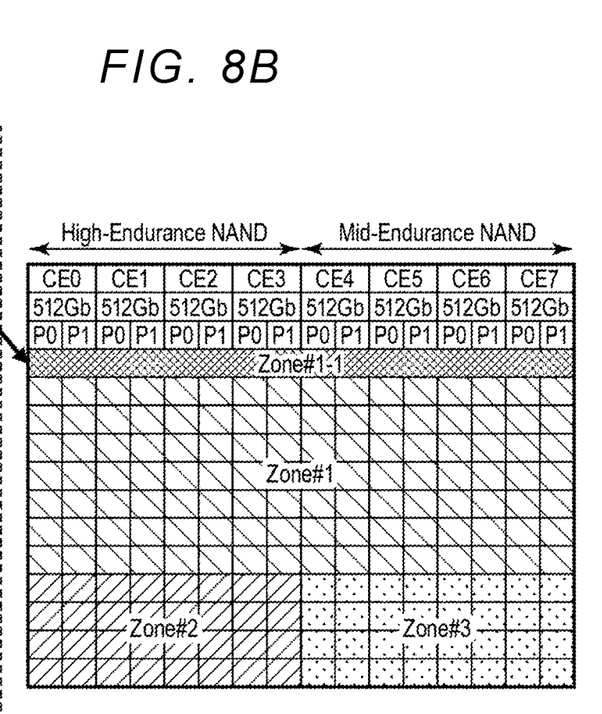

FIG. 8 is a diagram illustrating address management for the NAND memory 200 in the memory system 1 of at least one embodiment.

As illustrated in FIG. 8A, the data from the host 2 are managed in units of a file, and the logical addresses (LBA) thereof become consecutive. Therefore, in the memory system 1 of at least one embodiment, the physical address management unit 110 generates the logical blocks in which the physical addresses become consecutive and allocates one logical block to a predetermined number of consecutive logical addresses (partitions having a predetermined size). That is, the physical address management unit 110 manages the physical addresses of the NAND memory 200 so that the consecutive logical addresses and the consecutive physical addresses are associated with each other in units of a partition having a predetermined size.

For example, "File A", "File B", "File C", and "File D" are files in which Zone #1 is selected as a writing destination (a1). Further, "File E" and "File F" are files in which Zone #2 is selected as a writing destination (a2). And, "File G" and "File H" are files in which Zone #3 is selected as a writing destination (a3).

Each file is written to any one of the logical blocks in the logical areas (Zone #) of the writing destination. The physical address management unit 110 manages, for example, "File A" so as to be written to the logical block 214A (Zone #1-1) of Zone #1 as illustrated in FIG. 8B (a4). Similarly, the physical address management unit 110 manages the other files so as to be written to any one of the logical blocks in any one of the logical areas. In other words, data with consecutive logical addresses are written to each logical block of each logical area. That is, the physical address management unit 110 realizes managing of the consecutive logical addresses in units of a logical block.

Subsequently, with reference to FIG. 9, the averaging of the number of times of writing to the physical blocks 212 in the NAND memory 200 executed by the memory system 1 of at least one embodiment will be described.

As described above, in some cases, the bias in the data writing frequency to the three types of logical areas (Zone #1 to Zone #3) may occur according to the use of the host 2. As a countermeasure, the physical address management unit 110 counts the number of times of data writing for each of the three types of logical areas (Zone #1 to Zone #3). For example, when a difference in the number of times of data writing among the three types of logical areas (Zone #1 to Zone #3) exceeds a threshold value, the physical address management unit 110 updates the grouping of the physical blocks 212 in the NAND memory 200. That is, the assignment of the physical blocks 212 to each group is updated. The grouping of the physical blocks 212 in the NAND memory 200 is not limited to the case of updating according to the number of times of data writing among the logical areas (Zone #1 to Zone #3), and the physical address management unit 110 may count the number of times of data writing to each physical block, group the physical blocks 212 according to the number of times of data writing to each physical block, and update the assignment of the physical blocks 212 to each group.

Figure 9A:
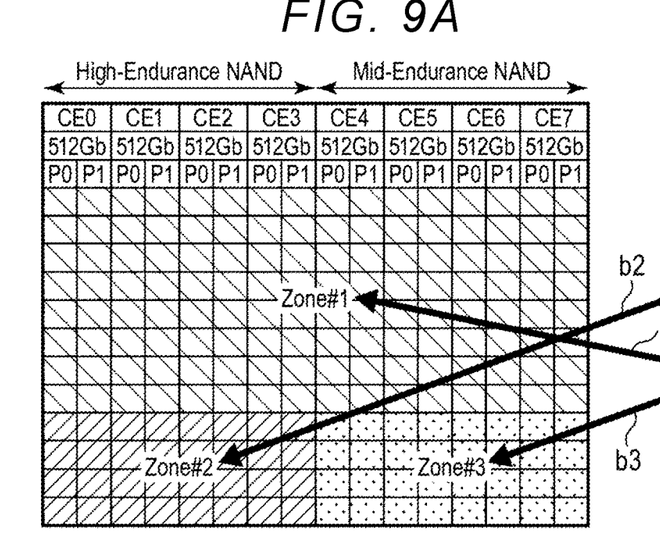
FIG. 9A and FIG. 9B are a diagram illustrating averaging of the number of times of writing to physical blocks in the NAND memory executed by the memory system of at least one embodiment.
Figure 9B:
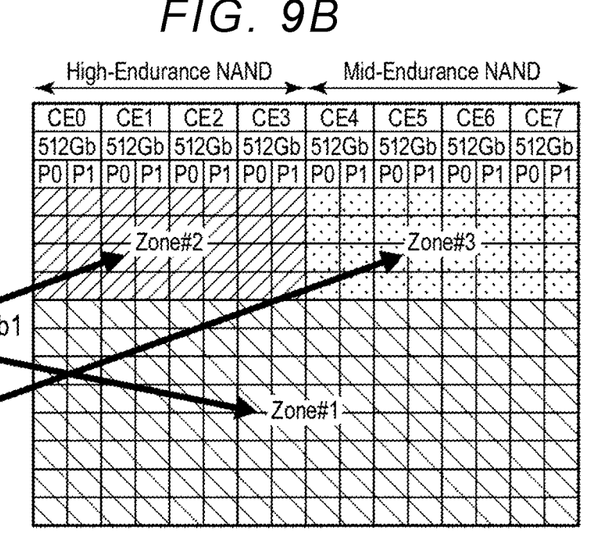

In the example illustrated in FIG. 9, a portion of the physical blocks 212 belonging to the first group used for generating the logical block 214A of Zone #1 and the physical blocks 212 belonging to the second group used for generating the logical block 214B of Zone #2 or the physical blocks 212 belonging to the third group used for generating the logical block 214C of Zone #3 are replaced therebetween. The movement of data (b1, b2, or b3) accompanying the replacement of the physical blocks 212 may be performed gradually by the function of moving the above-mentioned valid data in units of a logical block (214A, 214B, or 214C), for example, at each timing when there is no access from the host 2. For example, duplicating the data of the logical block of a movement source to a newly generated logical block of a movement destination and, after that, invalidating the data of the logical block of the movement source may be executed as a background process during idle.

As described above, since the physical address management unit 110 manages the physical addresses of the NAND memory 200 so that the consecutive logical addresses are associated with the consecutive physical addresses in the logical block, even after the data are moved, it is possible to maintain a state in which logical addresses become consecutive in units of a logical block. Accordingly, it is possible to minimize the influence of the replacement of the physical blocks 212 between the groups on the host 2.

Figure 10:
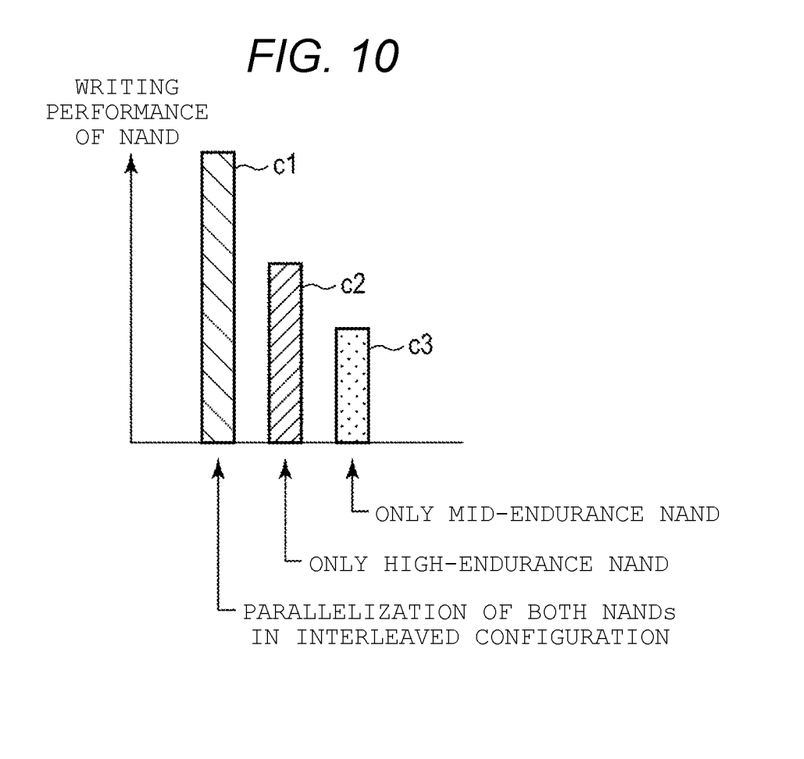
FIG. 10 is a diagram illustrating performance of the NAND memory in the memory system of at least one embodiment.

FIG. 10 is a diagram illustrating the performance of the NAND memory 200 in the memory system 1 of at least one embodiment.

The bar of reference numeral c1 indicates writing performance of the NAND memory 200 when the logical block 214A of Zone #1 in which the physical blocks 212 of the NAND chips 210 of High-Endurance and the physical blocks 212 of the NAND chips 210 of Mid-Endurance are parallelized in an interleaved configuration is used as a data writing destination.

The bar of reference numeral c2 indicates writing performance of the NAND memory 200 when the logical block 214B of Zone #2 which is configured with only the physical blocks 212 of the NAND chips 210 of High-Endurance is used as a data writing destination.

The bar of reference numeral c3 indicates writing performance of the NAND memory 200 when the logical block 214C of Zone #3 which is configured with only the physical blocks 212 of the NAND chips 210 of Low-Endurance is used as a data writing destination.

A writing performance value of the NAND memory 200 when the logical block 214A of Zone #1 is used as a data writing destination is theoretically is a sum of a writing performance value of the NAND memory 200 when the logical block 214B of Zone #2 is used as a data writing destination and a writing performance value of the NAND memory 200 when the logical block 214C of Zone #3 is used as a data writing destination (c1=c2+c3).

Figure 11:
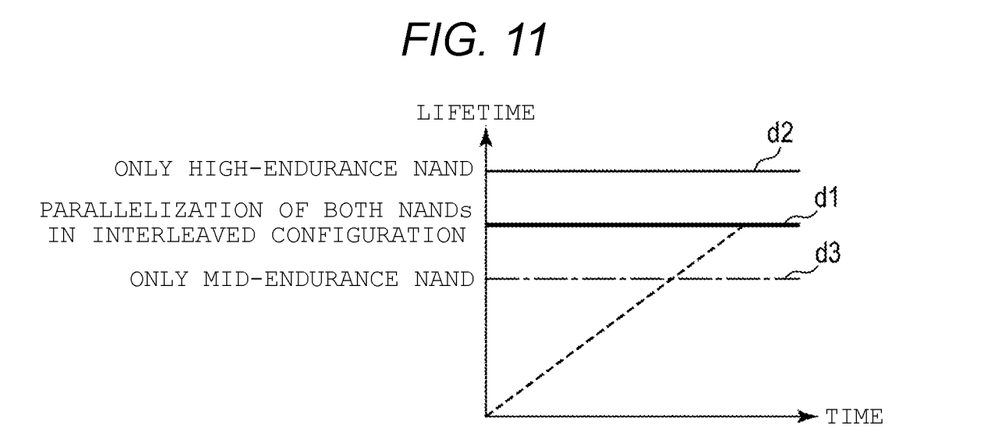
FIG. 11 is a diagram illustrating endurance of the NAND memory in the memory system of at least one embodiment.

Further, FIG. 11 is a diagram illustrating the endurance of the NAND memory 200 in the memory system 1 of at least one embodiment.

The line segment of reference numeral d1 indicates the endurance of the NAND memory 200 configured by mixing the NAND chips 210 of High-Endurance and the NAND chips 210 of Mid-Endurance of the memory system 1 of at least one embodiment.

Reference numeral d2 indicates the endurance of the NAND memory when the NAND memory 200 is configured with only the NAND chip of High-Endurance.

Reference numeral d3 indicates the endurance of the NAND memory when the NAND memory 200 is configured with only the NAND chip of Mid-Endurance.

The endurance of the NAND memory 200 configured by mixing the NAND chips 210 of High-Endurance and the NAND chips 210 of Mid-Endurance becomes theoretically in the middle of the endurance of the NAND memory configured with only the NAND chips of High-Endurance and the endurance of the NAND memory configured with only the NAND chips of Mid-Endurance due to the averaging of the number of times of data writing described above.

As described above, the memory system 1 of the embodiment generates the logical block 214A by parallelizing the physical blocks 212 of the NAND chips 210 of High-Endurance and the physical blocks 212 of the NAND chips 210 of Mid-Endurance in an interleaved configuration. Accordingly, the memory system 1 of at least one embodiment can realize achievement of cost, performance, and reliability which are not satisfied in the case where the NAND memory 200 is configured with only the NAND chips 210 of High-Endurance and in the case where the NAND memory 200 is configured with only the NAND chips 210 of Mid-Endurance.

For example, when the NAND chips 210 of High-Endurance and the NAND chips 210 of Mid-Endurance are simply mixed in one NAND memory 200 and the NAND chips 210 of High-Endurance and the NAND chips 210 of Mid-Endurance are used completely separately, the number of units of a process in which data writing and data reading can be performed simultaneously (in parallel) is halved, and thus, the performance cannot be satisfied. By generating the logical block 214A by parallelizing the physical blocks 212 of the NAND chips 210 of High-Endurance and the physical blocks 212 of the NAND chips 210 of Mid-Endurance in an interleaved configuration, the memory system 1 of the embodiment can maintain the performance while reducing the cost by adopting the NAND chips 210 of Mid-Endurance.

Figure 12:
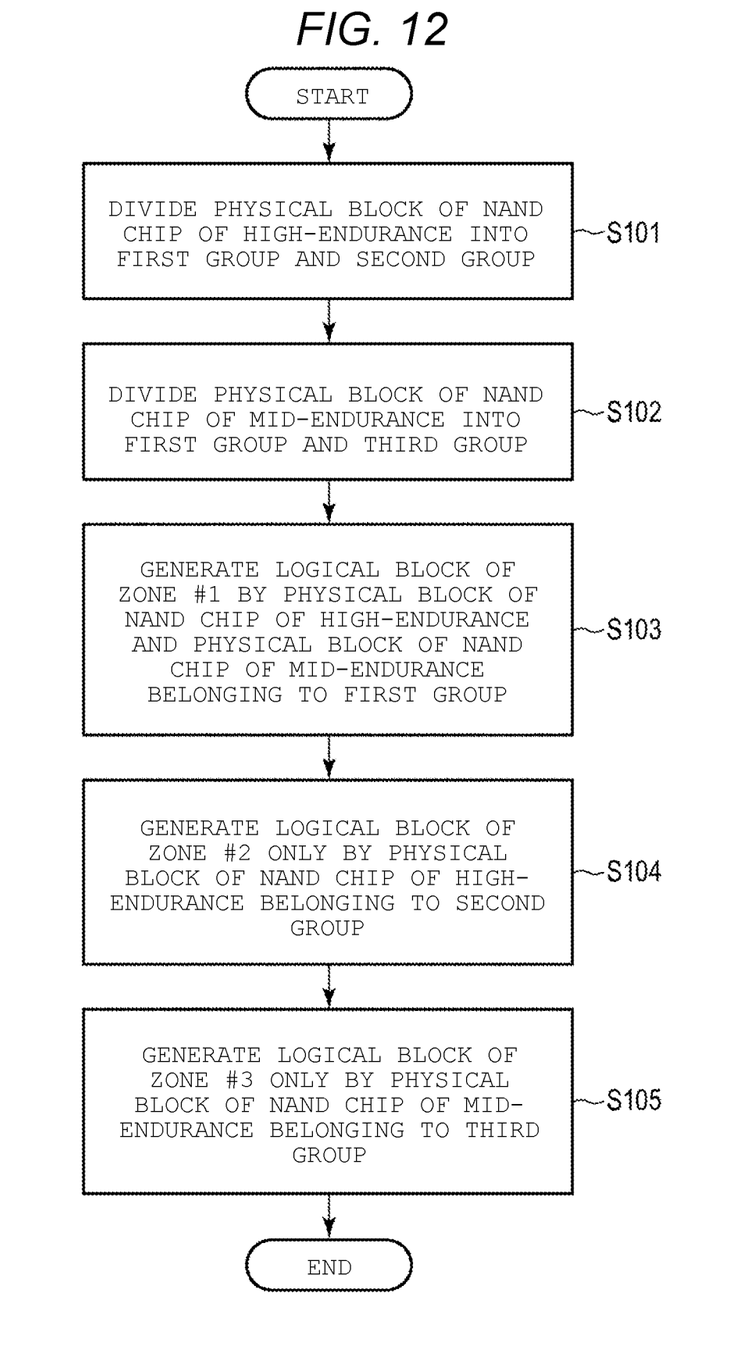
FIG. 12 is a flowchart illustrating a procedure of forming three types of logical areas on the NAND memory in the memory system of at least one embodiment.

FIG. 12 is a flowchart illustrating a procedure of forming three types of logical areas on the NAND memory 200 in the memory system 1 of at least one embodiment.

The physical address management unit 110 divides the physical blocks of the NAND chips 210 of High-Endurance into the first group and the second group (S101). Further, the physical address management unit 110 divides the physical blocks of the NAND chips 210 of Mid-Endurance into the first group and the third group (S102). The physical blocks 212 belonging to the first group include one logical area (Zone #1) on the NAND memory 200. Similarly, the aggregate of physical blocks 212 belonging to the second group forms one logical area (Zone #2) on the NAND memory 200, and the aggregate of physical blocks 212 belonging to the third group forms one logical area (Zone #3) on the NAND memory 200.

The physical address management unit 110 generates the logical block 214A of Zone #1 by the physical blocks 212 of the NAND chips 210 of High-Endurance and the physical blocks 212 of the NAND chips 210 of Mid-Endurance, which belong to the first group (S103). Further, the physical address management unit 110 generates the logical block 214B of Zone #2 with only the physical blocks 212 of the NAND chips 210 of High-Endurance belonging to the second group (S104). Further, the physical address management unit 110 generates the logical block 214C of Zone #3 with only the physical blocks 212 of the NAND chips 210 of Mid-Endurance belonging to the third group (S105).

As described above, the memory system 1 of at least one embodiment realizes satisfying the cost, the performance, and the reliability while minimizing the influence on the host 2 by generating and using three types of logical blocks including the logical block 214A in which the physical blocks 212 of the NAND chips 210 of High-Endurance and the physical blocks 212 of the NAND chips 210 of Mid-Endurance are parallelized in an interleaved configuration and by performing the replacement of the physical blocks 212 between the logical areas in units of a logical block.

By the way, in the above description, as an example of configuring the NAND memory 200 with a plurality of types of the NAND chips 210, the example of configuring the NAND memory 200 with the NAND chips 210 of High-Endurance and the NAND chips 210 of Mid-Endurance is provided. However, the configuration of the NAND memory 200 is not limited to the configuration with the two types of the NAND chips 210, and the NAND memory 200 may be configured with three or more types of the NAND chips 210.

Figure 13A:
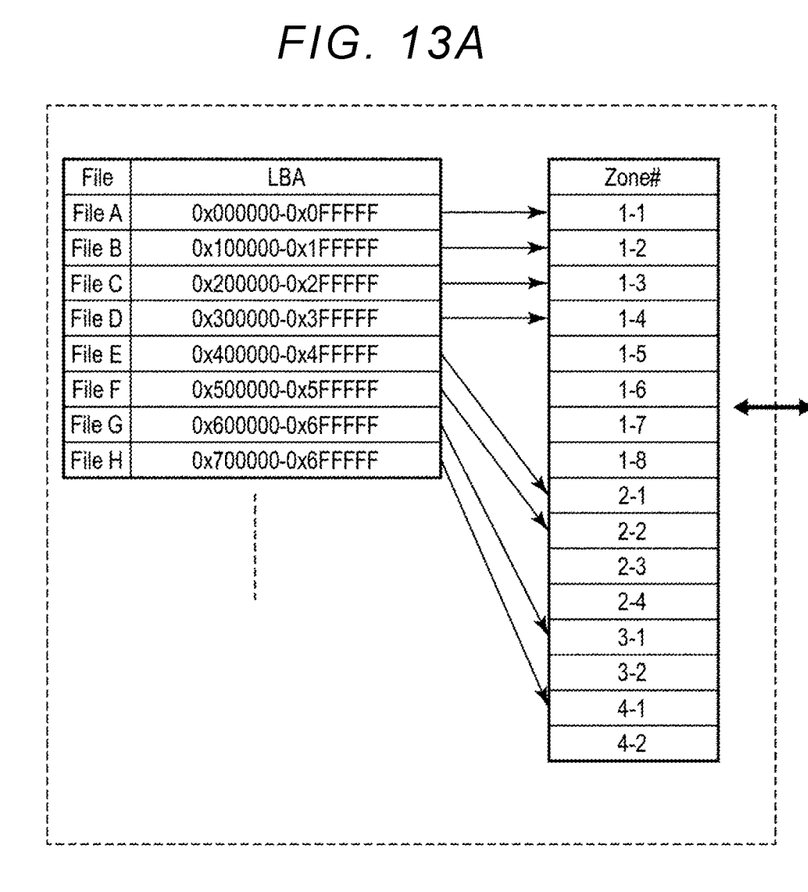
FIG. 13A and FIG. 13B are a diagram illustrating one modified example in which, in the memory system of at least one embodiment, a NAND memory is configured with a plurality of types of NAND chips.
Figure 13B:
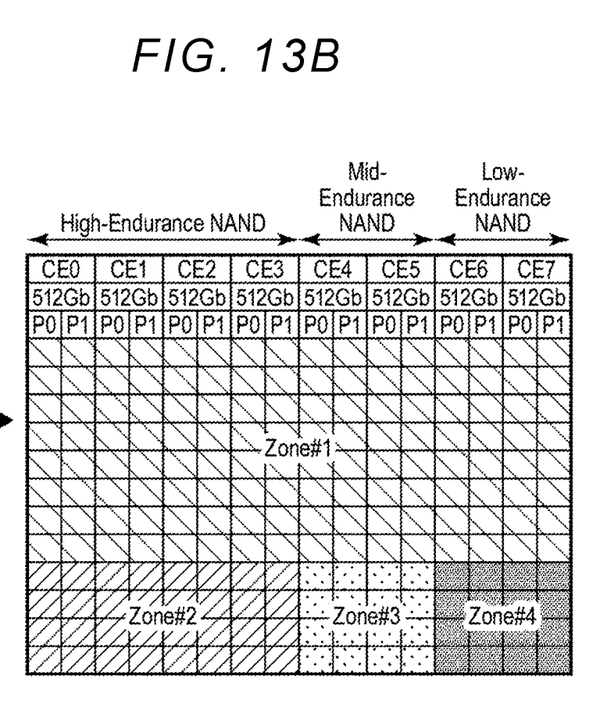

For example, as illustrated in FIG. 13, low-level endurance NAND chips (Low-Endurance NAND) 210 may be added to make three types, and the NAND memory 200 may be configured with four NAND chips 210 of High-Endurance, two NAND chips 210 of Mid-Endurance, and two NAND chips 210 of Low-Endurance. In this case, the physical address management unit 110 generates the logical block of Zone #1 with the physical blocks 212 of each plane 211 of the NAND chips 210 of High-Endurance, the physical blocks 212 of each plane 211 of the NAND chips 210 of Mid-Endurance, and the physical blocks 212 of each plane 211 of the NAND chip 210 of Low-Endurance. Further, the physical address management unit 110 generates the logical block of Zone #2 with only the physical blocks 212 of each plane 211 of the NAND chips 210 of High-Endurance, generates the logical block of Zone #3 with only the physical blocks 212 of each plane 211 of the NAND chips 210 of Mid-Endurance, and generates the logical block of Zone #4 with only the physical blocks 212 of each plane 211 of the NAND chips 210 of Low-Endurance.

Since the logical block of Zone #1 is a block in which the 16 physical blocks 212 are parallelized in an interleaved configuration and data writing and data reading can be performed simultaneously (in parallel), for example, on the 16 physical blocks 212, in order to reduce the cost, it is possible to adopt the NAND chips 210 of Mid-Endurance and the NAND chips 210 of Low-Endurance while maintaining the performance.

Figure 14A:
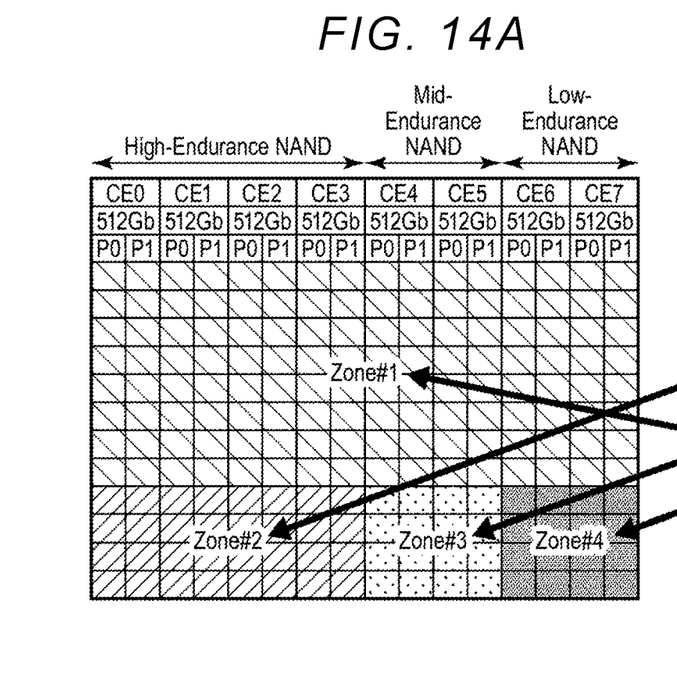
FIG. 14A and FIG. 14B are a diagram illustrating averaging of the number of times of writing to physical blocks in the case of the NAND memory having the configuration of FIGS. 13A and 13B.
Figure 14B:
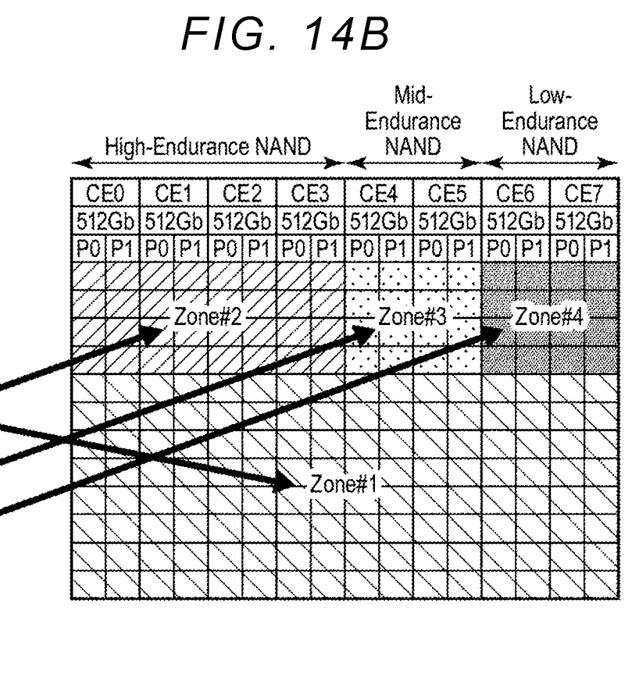

Further, also in this case, since the physical address management unit 110 manages the physical addresses of the NAND memory 200 so that the logical addresses become consecutive in units of a logical block in which the physical addresses become consecutive, it is possible to minimize the influence on the host 2 with respect to the replacement of the physical blocks 212 executed in order to eliminate a bias in the number of times of data writing among Zone #1 to Zone #4 and to average the number of times of data writing as illustrated in FIG. 14.

Further, in the above description, as a plurality of types of the NAND chips 210 including the NAND memory 200, the NAND chips 210 having different endurances are exemplified. However, the plurality of types of the NAND chips 210 are not limited to the NAND chips 210 having different endurance, and may be, for example, the NAND chips 210 having different cell types.

For example, the logical block in which the physical blocks 212 of the NAND chips 210 of triple level cells (TLC) and the physical blocks 212 of the NAND chips 210 of quad level cells (QLC) are parallelized in an interleaved configuration may also be generated by configuring the NAND memory 200 by mixing the NAND chips 210 having a memory cell array in which memory cells of the triple level cells (TLC), each of which can store 3-bit information, are arranged in a matrix configuration and the NAND chips 210 having a memory cell array in which memory cells of the quad level cells (QLC), each of which can store 4-bit information, are arranged in a matrix configuration.

As described above, the memory system 1 of the embodiment realizes satisfying the cost, the performance, and the reliability by a unique method of generating the logical block in which the physical blocks 212 of a plurality of types of the NAND chips 210 are parallelized in an interleaved configuration.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory including a plurality of memory chips including one or more first memory chips, each first memory chip including a plurality of physical blocks and one or more second memory chips, each second memory chip including a plurality of physical blocks, each memory chip configured to operate independently; and
a controller configured to communicate with a host and control the non-volatile memory,
wherein the controller is configured to:
configure a first logical block by parallelizing the physical blocks of each of the one or more first memory chips and the physical blocks of each of the one or more second memory chips in an interleaved configuration so that the physical blocks of each of the one or more first memory chips and the physical blocks of each of the one or more second memory chips can be used simultaneously;
generate a second logical block from the physical blocks of the first memory chip;
generate a third logical block from the physical blocks of the second memory chip;
divide the physical blocks of each of the one or more first memory chips into a group for the first logical block and a group for the second logical block; and
divide the physical blocks of each of the one or more second memory chips into a group for the first logical block and a group for the third logical block.

2. The memory system according to claim 1, wherein the first memory chip and the second memory chip have different endurance including reliability, lifetime, and performance.

3. The memory system according to claim 1, wherein each of the first memory chip and the second memory chip includes a memory cell array in which a plurality of memory cells are arranged in a matrix configuration, and the first memory chip and the second memory chip have different types of cells of the plurality of memory cells, each memory cell containing an amount of information which can be stored.

4. The memory system according to claim 1, wherein the controller is configured to allocate the first logical block, the second logical block, or the third logical block to each partition having a predetermined size of the non-volatile memory in which logical addresses indicating logical positions on the non-volatile memory are consecutive and which is used by the host to designate a position on the non-volatile memory.

5. The memory system according to claim 1, wherein the controller is configured to select a data writing destination among the first logical block, the second logical block, and the third logical block.

6. The memory system according to claim 5, wherein the controller is configured to select the data writing destination on the basis of at least one of an instruction from the host, a data transfer rate applied in an interface with the host, or a size of data transmitted from the host.

7. The memory system according to claim 1, wherein the controller is configured to count the number of times of data writing to the non-volatile memory for each group and update assignment of the physical blocks to the plurality of groups on the basis of the number of times of data writing for each group.

8. The memory system according to claim 1, wherein the plurality of memory chips include NAND chips.

9. A method of controlling a non-volatile memory by a controller, the non-volatile memory including a plurality of memory chips including one or more first memory chips, each first memory chip including a plurality of physical blocks and one or more second memory chips, each second memory chip including a plurality of physical blocks, each memory chip configured to operate independently, the method comprising:
   configuring a first logical block by parallelizing the physical blocks of each of the one or more first memory chips and the physical blocks of each of the one or more second memory chips in an interleaved configuration so that the physical blocks of each of the one or more first memory chips and the physical blocks of each of the one or more second memory chips can be used simultaneously;
   generating a second logical block from the physical blocks of the first memory chip;
   generating a third logical block from the physical blocks of the second memory chip;
   dividing the physical blocks of each of the one or more first memory chips into a group for the first logical block and a group for the second logical block; and
   dividing the physical blocks of each of the one or more second memory chips into a group for the first logical block and a group for the third logical block.

10. The method according to claim 9, wherein the first memory chip and the second memory chip have different endurance including reliability, lifetime, and performance.

11. The method according to claim 9, wherein each of the first memory chip and the second memory chip includes a memory cell array in which a plurality of memory cells are arranged in a matrix configuration, and the first memory chip and the second memory chip have different types of cells of the plurality of memory cells, each memory cell containing an amount of information which can be stored.

12. The method according to claim 9, further comprising:
   allocating the first logical block, the second logical block, or the third logical block to each partition having a predetermined size of the non-volatile memory in which logical addresses indicating logical positions on the non-volatile memory are consecutive and which is used by the host to designate a position on the non-volatile memory.

13. The method according to claim 9, further comprising selecting a data writing destination among the first logical block, the second logical block, and the third logical block.

14. The method according to claim 13, further comprising selecting the data writing destination on the basis of at least one of an instruction from the host, a data transfer rate applied in an interface with the host, or a size of data transmitted from the host.

15. The method according to claim 9, further comprising counting the number of times of data writing to the non-volatile memory for each group and updating assignment of the physical blocks to the plurality of groups on the basis of the number of times of data writing for each group.

16. The method according to claim 9, wherein the plurality of memory chips include NAND chips.

* * * * *